US012606004B2

(12) United States Patent
Fujioka et al.

(10) Patent No.: US 12,606,004 B2
(45) Date of Patent: Apr. 21, 2026

(54) CONTACTOR FAILURE DETERMINATION APPARATUS FOR VEHICLE

(71) Applicant: Mazda Motor Corporation, Aki-gun (JP)

(72) Inventors: Shinya Fujioka, Aki-gun (JP); Haruki Yamane, Aki-gun (JP); Junya Kono, Aki-gun (JP); Yuki Ida, Aki-gun (JP); Yuta Otsuka, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 867 days.

(21) Appl. No.: 17/944,446

(22) Filed: Sep. 14, 2022

(65) Prior Publication Data

US 2023/0106827 A1     Apr. 6, 2023

(30) Foreign Application Priority Data

Oct. 1, 2021     (JP) .................................. 2021-162917

(51) Int. Cl.
B60K 6/28          (2007.10)
B60L 58/20          (2019.01)

(52) U.S. Cl.
CPC ................ B60K 6/28 (2013.01); B60L 58/20 (2019.02)

(58) Field of Classification Search
CPC . B60K 6/28; B60L 58/20; B60L 53/14; B60L 3/00; G01R 31/006; G01R 31/327; Y02T 10/70; Y02T 10/7072; Y02T 90/14; H01H 47/002
See application file for complete search history.

(56) References Cited

U.S. PATENT DOCUMENTS

| | | | |
|---|---|---|---|
| 2005/0269981 A1* | 12/2005 | Sakurai ................. | B60W 10/08 |
| | | | 318/139 |
| 2006/0021098 A1 | 1/2006 | Tezuka | |
| 2019/0210481 A1* | 7/2019 | Ishida ..................... | B60L 53/62 |
| 2020/0247242 A1 | 8/2020 | Kojima et al. | |

FOREIGN PATENT DOCUMENTS

| | | |
|---|---|---|
| JP | 2000134707 A | 5/2000 |
| JP | 4572168 B2 | 10/2010 |
| JP | 2014193082 A | 10/2014 |

OTHER PUBLICATIONS

European Patent Office, Extended European Search Report Issued in EP Application No. 22193374.0, Feb. 7, 2023, Munich, 9 pages.

* cited by examiner

*Primary Examiner* — Alan D Hutchinson
(74) *Attorney, Agent, or Firm* — Alleman Hall LLP

(57)          ABSTRACT

To provide a contactor failure determination apparatus capable of appropriately determining failure of a contactor provided in a vehicle, a voltage sensor capable of detecting rising or dropping of a voltage of a second circuit including an external charger is provided. When a vehicle start request is made, a first control for closing one external charging contactor is executed, a second control for closing a pre-charge contactor is executed after execution of the first control, a third control for closing a main contactor, which is not parallel with the pre-charge contactor, is executed after execution of the second control, and in response to the voltage sensor detecting that the voltage of the second circuit has risen after execution of the third control, it is determined that the other external charging contactor has failed in a closed state.

20 Claims, 10 Drawing Sheets

CONTACTOR FAILURE DETERMINATION APPARATUS FOR VEHICLE

TECHNICAL FIELD

The present disclosure relates to a contactor failure determination apparatus that is mounted to a vehicle including a plurality of contactors.

BACKGROUND ART

Conventionally, an inverter and a motor are mounted to a vehicle so as to supply electric power from a battery to the motor via the inverter, and a connection/disconnection device is provided between the battery and a circuit having the inverter and the motor to make/interrupt electrical connection therebetween.

For example, in JP4572168B2, a battery (a DC power supply in JP4572168B2) and a load circuit are connected in an electrically connectable/disconnectable manner by plural relays. More specifically, in an apparatus disclosed in JP4572168B2, a first main relay is disposed between a positive electrode terminal of the battery and the load circuit, a second main relay is disposed between a negative electrode terminal of the battery and the load circuit, and a pre-charge relay and an electrical resistor are disposed in parallel with the second main relay. When the apparatus that makes/interrupts the electrical connection between the battery and the circuit is provided therebetween, just as described, unnecessary exchange of the electric power between the battery and the circuit can be prevented by controlling such an apparatus.

However, when the apparatus fails, the electrical connection between the battery and the circuit is no longer appropriately made/interrupted. For this reason, it has been requested that the failure of the apparatus can be diagnosed. To answer such a request, the apparatus disclosed in JP4572168B2 is configured as follows. The first main relay is opened in a state where the second main relay is closed and the pre-charge relay is opened during a stop of the vehicle. Then, failure of the first main relay is determined on the basis of a voltage generated to the load circuit at this time. Thereafter, the pre-charge relay is closed while the second main relay is opened. Then, failure of the second main relay is determined on the basis of the voltage generated to the load circuit at this time.

SUMMARY OF THE INVENTION

Problem to be Solved by the Invention

Here, there is a case where a device capable of charging the battery from an external power supply, that is, an external charger for supplying output power of the power supply to the battery by connecting the external power supply and the battery is mounted to the vehicle, to which the motor is mounted as a drive source or the like. In this case, in order to prevent an unnecessary power exchange between the external charger and another electrical device or the battery, it is desired to configure an electrical connection between the external charger and a circuit connected thereto to be made or interrupted by providing a contactor, and it is also desired to appropriately determine failure of the contactor.

The present disclosure has been made in view of circumstances as described above and therefore has a purpose of providing a contactor failure determination apparatus for a vehicle capable of appropriately determining failure of a contactor provided to the vehicle.

Means for Solving the Problem

To solve the above problem, the inventors of the present disclosure have examined connecting an external charger to a circuit, which is connected to a battery, via a contactor (an external charging contactor), to close the external charging contactor at the same time as closing of a contactor, which connects/disconnects the battery to/from the circuit, at a start of a vehicle, and determining a failure of the external charging contactor on the basis of a change in a voltage on the external charger side that occurs at this time. However, it is understood that, when a contactor on the battery side and the external charging contactor are closed at the same time, a relatively loud noise is generated due to the closing of multiple contactors at the same time. The inventors of the present disclosure have also examined a configuration to close the external charging contactor after the contactor on the battery side is closed. However, it is understood that, in this configuration, a high in-rush current is possibly introduced into the external charger side from the battery via the circuit. Based on the above findings, the inventors of the present disclosure have invented the following as a contactor failure determination apparatus capable of appropriately determining failure of the contactors.

More specifically, the present disclosure provides a contactor failure determination apparatus mounted to a vehicle including a battery that includes a positive electrode terminal and a negative electrode terminal, a first circuit that includes an inverter and a motor, a first main contactor that makes or interrupts electrical connection between the first circuit and one terminal of the positive electrode terminal and the negative electrode terminal, a second main contactor that makes or interrupts electrical connection between the first circuit and the other terminal of the positive electrode terminal and the negative electrode terminal, and a pre-charge contactor that is disposed in parallel with the first main contactor and makes or interrupts the electrical connection between the first circuit and the one terminal. The contactor failure determination apparatus includes a second circuit that includes an external charger configured to supply electric power from an external power supply to the battery so as to charge the battery, a pair of external charging contactors that make or interrupt electrical connection between positive-electrode side lines of the first circuit and the second circuit and between negative-electrode side lines of the first circuit and the second circuit, a voltage sensor configured to detect rising or dropping of a voltage of the second circuit, and a controller that controls the first main contactor, the second main contactor, the pre-charge contactor, and each of the external charging contactors such that these contactors are opened during a stop of the vehicle. Electrical resistance between the terminal and the first circuit via the pre-charge contactor is set to be higher than electrical resistance between the terminal and the first circuit via the first main contactor. In response to a vehicle start request as a request to start the vehicle being made, the controller executes a first control for closing one of the external charging contactors, executes a second control for closing the pre-charge contactor after execution of the first control, executes a third control for closing the second main contactor after execution of the second control, and in response to the voltage sensor detecting that the voltage of the second circuit has risen after execution of the third control, determines that the other of the external charging contactors has failed in a closed state.

In this configuration, when the vehicle start request is made, the above first, second, and third controls are executed, and the one external charging contactor, the pre-charge contactor, and the second main contactor are closed in this order. Accordingly, it is possible to avoid all of the contactors being closed at the same time immediately after the vehicle start request is made, for example, immediately after an occupant performs an operation to start the vehicle, and it is thus possible to avoid generation of a relatively loud noise that is associated with the closing of multiple contactors at the same time. Therefore, it is possible to prevent the occupant from feeling a sense of discomfort at the start of the vehicle.

In addition, in this apparatus, the one terminal of the battery and the first circuit are connected via the pre-charge contactor with the high electrical resistance, and thereafter the other terminal of the battery and the first circuit are electrically connected via the second main contactor. Therefore, it is possible to prevent a high in-rush current from flowing from the battery to the first circuit and thus to the second circuit when the battery and the first circuit are electrically connected, and thus to prevent failure of electrical devices provided in the first circuit and the external charger.

Furthermore, in this configuration, since the failure of the external charging contactor is determined on the basis of rising or dropping of the voltage of the second circuit after execution of the third control, the failure of the external charging contactor can appropriately be determined.

More specifically, the battery and the first circuit are electrically connected by execution of the second control and the third control. Accordingly, even in the case where the one external charging contactor is closed by execution of the first control, the first circuit and the second circuit are not electrically interrupted as long as the other external charging contactor is opened normally. Thus, the voltage of the second circuit does not rise. On the other hand, in the case where the other external charging contactor fails in the closed state, the battery and the second circuit are electrically connected via the first circuit in conjunction with the electrical connection between the battery and the first circuit, and thus the voltage of the second circuit rises. In this configuration, by using the above, in the case where the voltage of the second circuit has risen after execution of the third control, it is determined that the other external charging contactor has failed in the closed state. Therefore, it is possible to appropriately determine the failure of the external charging contactor.

In this configuration, preferably, when executing the first control in response to an immediately subsequent vehicle start request, the controller closes the other external charging contactor rather than the one external charging contactor.

With this configuration, the failure of the two external charging contactors can be determined in response to at least two times of making of the vehicle start request. In addition, when a single vehicle start request is made, the failure determination is only made on one of the external charging contactors. Therefore, it is possible to reduce a period from a time at which the vehicle start request is made to a time at which the vehicle starts traveling after the failure determination.

In the configuration, preferably, after executing the third control, the controller closes the first main contactor and opens the pre-charge contactor and the one external charging contactor.

With this configuration, after execution of the third control, the battery and the first circuit are connected via each of the main contactors in a low electrical resistance state. In addition, the electrical connection between the battery and the second circuit via the external charging contactor and the first circuit is interrupted. Accordingly, after execution of the third control, the high electric power can be supplied from the battery to the motor provided in the first circuit. Therefore, in the case where the motor functions as a drive source of the vehicle, the vehicle can travel appropriately.

In this configuration, preferably, a second voltage sensor capable of detecting rising or dropping of a voltage of the first circuit is provided, and, in response to the second voltage sensor detecting that the voltage of the first circuit has risen after execution of the second control, the controller determines that the second main contactor has failed in a closed state.

As long as the second main contactor is normally opened, the battery and the first circuit are electrically interrupted even when the second control is executed to close the pre-charge contactor. On the other hand, in the case where the second main contactor fails in the closed state, the voltage of the first circuit rises when the battery and the first circuit are electrically connected due to execution of the second control. In this configuration, by using the above, in the case where the voltage of the first circuit has risen after execution of the second control, it is determined that the second main contactor has failed in the closed state. Therefore, in addition to the external charging contactors, it is possible to appropriately determine whether the second main contactor has failed.

In this configuration, preferably, in response to the second voltage sensor detecting that the voltage of the first circuit has not risen after execution of the third control, the controller determines that at least one of the pre-charge contactor and the second main contactor has failed in an open state.

As long as both of the pre-charge contactor and the second main contactor are normal, the battery and the first circuit are electrically connected and the voltage of the first circuit rises when the third control is executed to close both of the pre-charge contactor and the second main contactor. On the other hand, in the case where at least one of the pre-charge contactor and the second main contactor fails in the open state, the battery and the first circuit are maintained in an electrically interrupted state even when the third control is executed, and the voltage of the first circuit does not rise. In this configuration, by using the above, in the case where the voltage of the first circuit has not risen after execution of the third control, it is determined that at least one of the pre-charge contactor and the second main contactor has failed in the open state. Therefore, it is possible to appropriately determine the failure of these contactors.

In this configuration, preferably, the controller executes a fourth control for closing the first main contactor after execution of the third control, executes a fifth control for opening the pre-charge contactor after execution of the fourth control, and in response to the second voltage sensor detecting that the voltage of the first circuit has dropped after execution of the fifth control, determines that the first main contactor has failed in an open state.

When the first main contactor is normal, the battery and the first circuit are electrically connected via the first main contactor by executing the fourth control. Thus, the voltage of the first circuit does not drop even when the pre-charge contactor is opened due to execution of the fifth control. On the other hand, in the case where the first main contactor fails in the open state, the electrical connection between the battery and the first circuit is interrupted by opening the pre-charge contactor due to execution of the fifth control. As a result, the voltage of the first circuit drops. In this configuration, by using the above, in the case where the voltage of the first circuit has dropped after execution of the fifth control, it is determined that the first main contactor has failed in the open state. Therefore, it is possible to appropriately determine the failure of the first main contactor.

In this configuration, preferably, a time from execution of the second control to execution of the third control is set to be shorter than a time from execution of the third control to execution of the fourth control.

In this configuration, preferably, the time from execution of the third control to execution of the fourth control is set to be longer than a time from execution of the fourth control to execution of the fifth control.

In this configuration, preferably, the time from execution of the fourth control to execution of the fifth control is set to be longer than the time from execution of the first control to execution of the second control.

With the time settings as described above, it is possible to further appropriately determine the failure of the contactors.

In this configuration, preferably, the controller executes a sixth control for opening the one external charging contactor, which is closed during execution of the first control, in a state where the first circuit and the battery are electrically connected after execution of the third control, and determines that each of the external charging contactors has failed in the closed state in response to the voltage sensor detecting that the voltage of the second circuit has not dropped after execution of the sixth control.

In the case where the one external charging contactor fails in the closed state while the other external charging contactor is normal, the electrical connection between the battery and the second circuit is interrupted by opening the other external charging contactor in the state where the first circuit and the battery are electrically connected. As a result, the voltage of the second circuit drops. Meanwhile, in the case where the other external charging contactor also fails in the closed state, the electrical connection between the battery and the second circuit is maintained even when it is attempted to control the other external charging contactor to be opened in the state where the first circuit and the battery are electrically connected. As a result, dropping of the voltage of the second circuit does not occur. In this configuration, by using the above, in the case where the other external charging contactor is controlled to be opened, and it has been determined that the voltage of the second circuit has neither risen nor dropped and that the one external charging contactor has failed in the closed state, it is determined that the other external charging contactor also failed in the closed state in addition to the one external charging contactor. Therefore, it is possible to appropriately determine the failure of both of the external charging contactors.

In this configuration, preferably, the external charger has an AC/DC converter that converts an AC current to a DC current, converts the AC current of an external AC power supply to the DC current, and supplies the DC current to the battery.

In this configuration, preferably, the time from execution of the first control to execution of the second control is set to be shorter than the time from execution of the second control to execution of the third control.

With the time settings as described above, it is possible to further appropriately determine the failure of the contactors.

Advantage of the Invention

As it has been described so far, the contactor failure determination apparatus for a vehicle according to the present disclosure can appropriately determine the failure of the contactors provided in the vehicle.

BRIEF DESCRIPTION OF THE DRAWINGS

FIG. 9 includes graphs illustrating the time changes in the parameters at the time when the vehicle start request is made, in which (a) is a graph in the case where the contactors are normal, (b) is a graph of an on-board charging (OBC) voltage in the case where a target OBC contactor is fixed to be ON, and (c) is a graph of the OBC voltage in the case where both of the OBC contactors are fixed to be ON.

MODES FOR CARRYING OUT THE INVENTION (1) Overall Configuration of Vehicle

Figure 1:
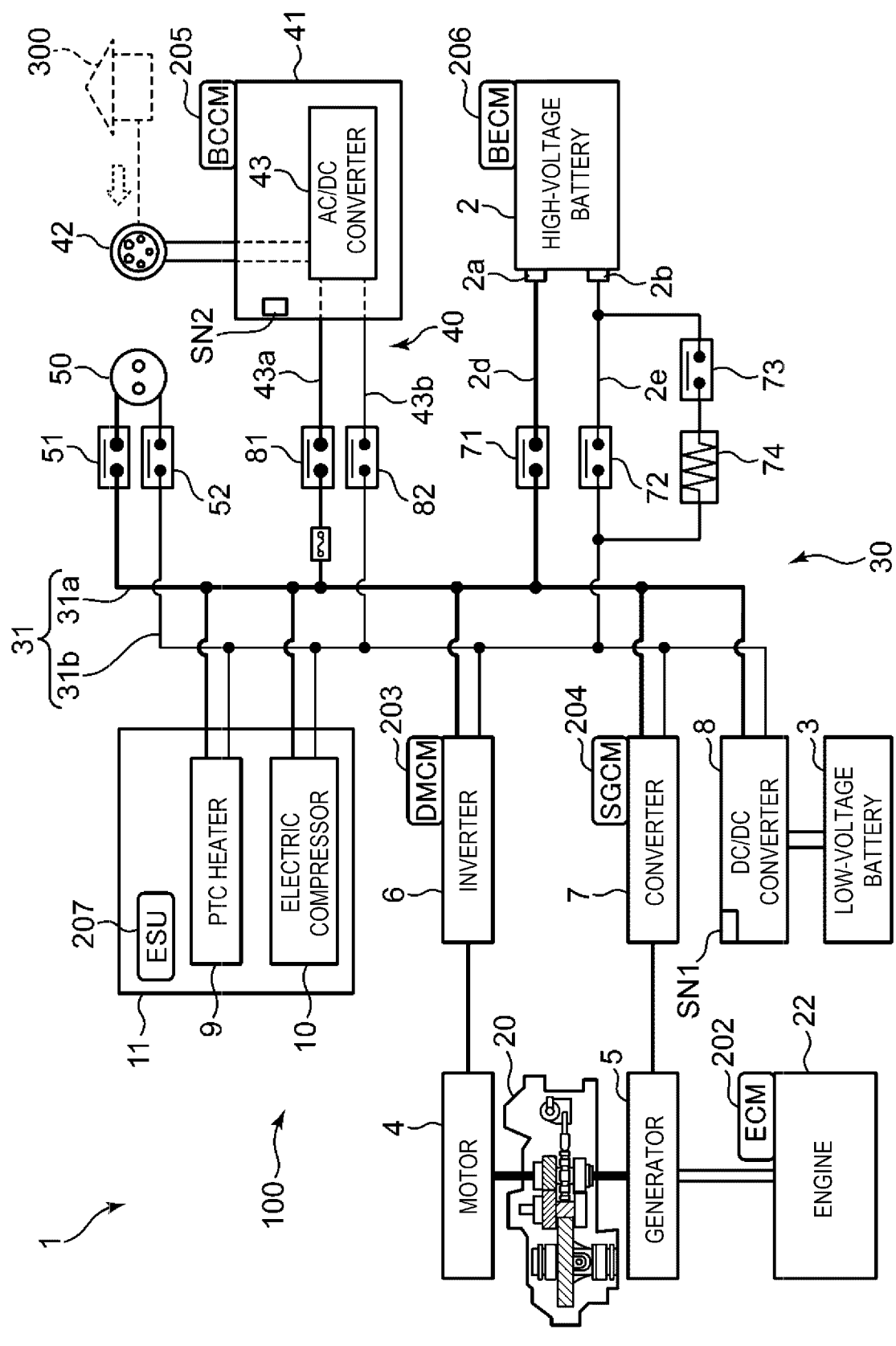
FIG. 1 is a view schematically illustrating a configuration of a vehicle to which a contactor failure determination apparatus according to an embodiment of the present invention is mounted.

A description will be made on a contactor failure determination apparatus according to an embodiment of the present disclosure. FIG. 1 is a view schematically illustrating a configuration of a vehicle 1 to which a contactor failure determination apparatus 100 according to this embodiment is mounted. The vehicle 1 is a four-wheeled automobile, for example.

The vehicle 1 (the contactor failure determination apparatus 100) has a high-voltage battery 2, a low-voltage battery 3, an output voltage of which is lower than the high-voltage battery 2, a high-voltage circuit 30 that has a plurality of electrical devices and is electrically connected to the high-voltage battery 2, an on-board charging (OBC) circuit 40 that is electrically connected to the high-voltage circuit 30, and a plurality of contactors. The vehicle also has a plurality of controllers, each of which includes a microprocessor and the like and controls a respective part of the vehicle 1. The high-voltage battery 2 is an example of a "battery" in the present disclosure, the high-voltage circuit 30 is an example of a "first circuit" in the present disclosure, and the OBC circuit 40 is an example of "second circuit" in the present disclosure.

(Battery)

The high-voltage battery 2 has a pair of terminals (a positive electrode terminal 2a and a negative electrode terminal 2b). In this embodiment, a Li battery (a lithium battery) is mounted as the high-voltage battery 2 to the vehicle 1. For example, the high-voltage battery 2 is configured to have a plurality of battery modules, each of which includes 12 battery cells, and which are connected in series. Six of the battery cells are connected in series in each set, and two sets of these six battery cells are connected in parallel. In addition, in this embodiment, a lead battery is mounted as the low-voltage battery 3 to the vehicle 1. For example, a nominal voltage of the high-voltage battery 2 is 24 V, and a nominal voltage of the low-voltage battery 3 is 12 V.

(High-Voltage Circuit)

The high-voltage circuit 30 includes, as the electrical devices, a motor 4, a generator 5, an inverter 6, a converter 7, a DC/DC converter 8, a positive temperature coefficient (PTC) heater 9, an electric compressor 10, and the like. The high-voltage circuit 30 also has a P-side high-voltage line 31a that is a line on a positive electrode side connected to the positive electrode terminal 2a of the high-voltage battery 2 and an N-side high-voltage line 31b that is a line on a negative electrode side connected to the negative electrode terminal 2b of the high-voltage battery 2. Hereinafter, the P-side high-voltage line 31a and the N-side high-voltage line 31b will appropriately and collectively be referred to as a high-voltage line 31.

The inverter 6, the converter 7, the DC/DC converter 8, the PTC heater 9, and the electric compressor 10 are each connected to the high-voltage line 31. The motor 4 is connected to the high-voltage line 31 via the inverter 6. The generator 5 is connected to the high-voltage line 31 via the converter 7.

The motor 4 rotates when being supplied with electric power from the high-voltage battery 2. The motor 4 is mounted as a drive source of the vehicle 1 to the vehicle 1, and output of the motor 4 is transmitted to wheels (not illustrated) via a drive power transmission apparatus 20.

The generator 5 is a generating unit for charging the high-voltage battery 2. The vehicle 1 in this embodiment is a series-type hybrid vehicle. That is, an engine 22 that drives the generator 5 is mounted to the vehicle 1, the generator 5 generates the electric power when being rotationally driven by the engine 22, and the electric power generated by the generator 5 is supplied to the high-voltage battery 2. The engine 22 is a rotary engine, for example. The generator 5 is also connected to the wheels via the drive power transmission apparatus 20, and the vehicle 1 can regenerate energy during deceleration.

The inverter 6 is a device that converts a DC current to an AC current, converts the DC current from the high-voltage battery 2 to the AC current, and supplies the AC current to the motor 4. The converter 7 is a device that converts the AC current to the DC current, converts the AC current, which is generated by the generator 5, to the DC current, and supplies the DC current to the high-voltage battery 2.

The DC/DC converter 8 is a device that steps down input power for output, steps down an output voltage of the high-voltage battery 2, and supplies the step-down voltage to the low-voltage battery 3. The DC/DC converter 8 is provided with a main voltage sensor SN1 capable of detecting a voltage of the electric power that is input to the DC/DC converter 8 via the high-voltage line 31, that is, a voltage of the high-voltage circuit 30. The main voltage sensor SN1 is one example of a "second voltage sensor" in the disclosure.

The PTC heater 9 and the electric compressor 10 constitute an air conditioner 11 for the vehicle 1. More specifically, the PTC heater 9 is a device for heating inside of a cabin in the vehicle 1, and the electric compressor 10 is a device for cooling the inside of the cabin in the vehicle 1. In this embodiment, a cooling plate (not illustrated) for cooling the high-voltage battery 2 is provided, and the electric compressor 10 also cools this cooling plate.

(OBC Circuit)

The OBC circuit 40 includes an on-board charger (OBC) 41, an AC charging inlet 42, and the like. The OBC circuit 40 also has a P-side OBC line 43a that is a line on the positive electrode side connected to the P-side high-voltage line 31a and an N-side OBC line 43b that is a line on the negative electrode side connected to the N-side high-voltage line 31b.

The OBC 41 is a device for supplying electric power from an external power supply 300 to the high-voltage battery 2 so as to charge the high-voltage battery 2. In this embodiment, the OBC 41 receives the electric power from the external AC power supply 300 to charge the high-voltage battery 2. For this reason, the OBC 41 has an AC/DC converter 43 that is a device for converting the AC current to the DC current. The AC charging inlet 42 is a device for electrically connecting the OBC 41 and a cable connected to the external AC power supply 300. The AC charging inlet 42 is configured to be electrically connected to the OBC 41, and is configured that a connector provided at an end of the cable is inserted therein and fitted thereto. The OBC 41 is provided with an OBC voltage sensor SN2 capable of detecting a voltage of the OBC circuit 40. The OBC 41 is an example of an "external charger" in the present disclosure, and the OBC voltage sensor SN2 is one example of a "voltage sensor" in the present disclosure.

In this embodiment, electric power from an external DC power supply can also be used to charge the high-voltage battery 2. More specifically, the vehicle 1 is provided with a DC charging inlet 50 that is connected to the high-voltage circuit 30 via contactors 51, 52. The DC charging inlet 50 is fitted to a connector of a cable that is connected to the external DC power supply, and electrically connects the external DC power supply and the high-voltage circuit 30.

(Controller)

Figure 2:
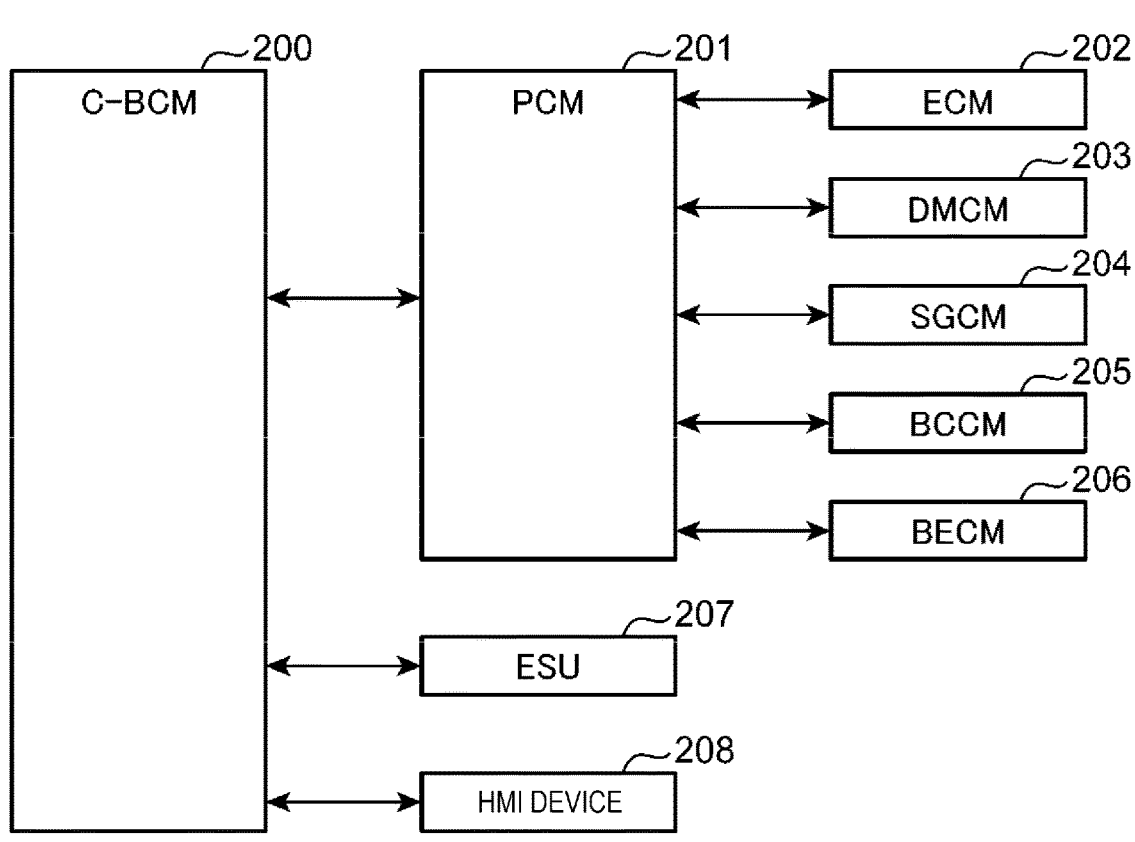
FIG. 2 is a block diagram illustrating relationships among controllers.

FIG. 2 is a block diagram illustrating relationships among the various controllers mounted to the vehicle 1. The controllers include a center-body control module (C-BCM) 200, a power control module (PCM) 201, an engine control module (ECM) 202, a driver motor control module (DMCM) 203, a starter generator control module (SGCM) 204, a battery charger control module (BCCM) 205, a battery energy control module (BECM) 206, an electric supply unit (ESU) 207 are mounted. These controllers 200 to 207 are connected to the low-voltage battery 3, and are actuated when receiving the electric power from the low-voltage battery 3.

Each of the controllers 200 to 207 primarily executes the following control. The C-BCM 200 controls a door, a window, and the like. The PCM 201 controls devices in a drive system of the vehicle 1. The ECM 202 controls the engine 22. The DMCM 203 controls the inverter 6. The SGCM 204 controls the converter 7. The BCCM 205 controls the OBC 41. The BECM 206 controls the high-voltage battery 2. The ESU 207 controls the air conditioner 11. These controllers 200 to 207 mutually exchange signals. For example, these controllers 200 to 207 make controller area network (CAN) communication.

Here, a human-machine interface (HMI) device 208 illustrated in FIG. 2 is a device that shows various types of information, and the like, and includes a display and the like.

(Contactors)

The vehicle 1 is provided with, as the contactors, a pair of main contactors 71, 72 (a P-side main contactor 71 and an N-side main contactor 72), a pre-charge contactor 73, and a pair of OBC contactors 81, 82 (a P-side OBC contactor 81 and an N-side OBC contactor 82). The contactor is an electromagnetic switch that includes an electromagnet, and makes/interrupts electrical connection between two contact points according to the supplied electric power. When the contactor is closed, the two contact points are electrically connected and brought into an energized state. When the contactor is opened, the two contact points are electrically interrupted and brought into a non-energized state.

(Main Contactors)

The P-side main contactor 71 makes/interrupts electrical connection between the positive electrode terminal 2a of the high-voltage battery 2 and the high-voltage circuit 30. More specifically, two contact points of the P-side main contactor 71 are respectively connected to the positive electrode terminal 2a (in detail, a positive electrode side battery line 2d that is connected to the positive electrode terminal 2a) of the high-voltage battery 2 and the P-side high-voltage line 31a. The P-side main contactor 71 makes/interrupts the electrical connection between the positive electrode terminal 2a of the high-voltage battery 2 and the P-side high-voltage line 31a.

The N-side main contactor 72 connects/disconnects the negative electrode terminal 2b of the high-voltage battery 2 to/from the high-voltage circuit 30. More specifically, two contact points of the N-side main contactor 72 are respectively connected to the negative electrode terminal 2b (in detail, a negative electrode side battery line 2e that is connected to the negative electrode terminal 2b) of the high-voltage battery 2 and the N-side high-voltage line 31b. The N-side main contactor 72 makes/interrupts electrical connection between the negative electrode terminal 2b of the high-voltage battery 2 and the N-side high-voltage line 31b.

The pre-charge contactor 73 is disposed in a parallel state with one of the main contactors 71, 72, and connects/disconnects one of the terminals 2a, 2b of the high-voltage battery 2 and/from the high-voltage circuit 30. More specifically, two contact points of the pre-charge contactor 73 are respectively connected to one of the terminals 2a, 2b of the high-voltage battery 2 and the high-voltage line 31 corresponding thereto. These are connected/disconnected by the pre-charge contactor 73 in addition to the main contactor. However, electrical resistance between one of the terminals 2a, 2b of the high-voltage battery 2 and the high-voltage line 31 via the pre-charge contactor 73 is greater than electrical resistance between one of the terminals 2a, 2b of the high-voltage battery 2 and the high-voltage line 31 via the main contactor that is arranged in parallel with the pre-charge contactor 73. Accordingly, in a state where both of the pre-charge contactor 73 and the main contactor, which is arranged in parallel therewith, are closed, electricity flows through the line on the main contactor side with the lower electrical resistance than the line on the pre-charge contactor 73 side.

In this embodiment, the pre-charge contactor 73 is provided between the negative electrode terminal 2b of the high-voltage battery 2 and the N-side high-voltage line 31b, and makes/interrupts the electrical connection therebetween. In addition, a resistor 74 is provided between the pre-charge contactor 73 and the N-side high-voltage line 31b. Hereinafter, the pre-charge contactor 73 will appropriately be referred to as a pre-contactor 73.

In this embodiment, the pre-contactor 73 is provided to connect/disconnect the negative electrode terminal 2b to/from the N-side high-voltage line 31b. In conjunction therewith, the N-side main contactor 72, which is disposed in parallel with the pre-contactor 73, is an example of a "first main contactor" in the present disclosure, and the P-side main contactor 71 is an example of a "second main contactor" in the present disclosure.

(OBC Contactors)

The P-side OBC contactor 81 and the N-side OBC contactor 82 each make/interrupt electrical connection between the high-voltage circuit 30 and the OBC circuit 40.

More specifically, two contact points of the P-side OBC contactor 81 are respectively connected to the P-side OBC line 43a and the P-side high-voltage line 31a. The P-side OBC contactor 81 makes/interrupts electrical connection between the P-side OBC line 43a and the P-side high-voltage line 31a. The two contact points of the N-side OBC contactor 82 are respectively connected to the N-side OBC line 43b and the N-side high-voltage line 31b. The N-side OBC contactor 82 makes/interrupts electrical connection between the N-side OBC line 43b and the N-side high-voltage line 31b.

The P-side OBC contactor 81 and the N-side OBC contactor 82 are each an example of an "external charging contactor" in the present disclosure.

(Control Configuration of Contactors)

Figure 3:
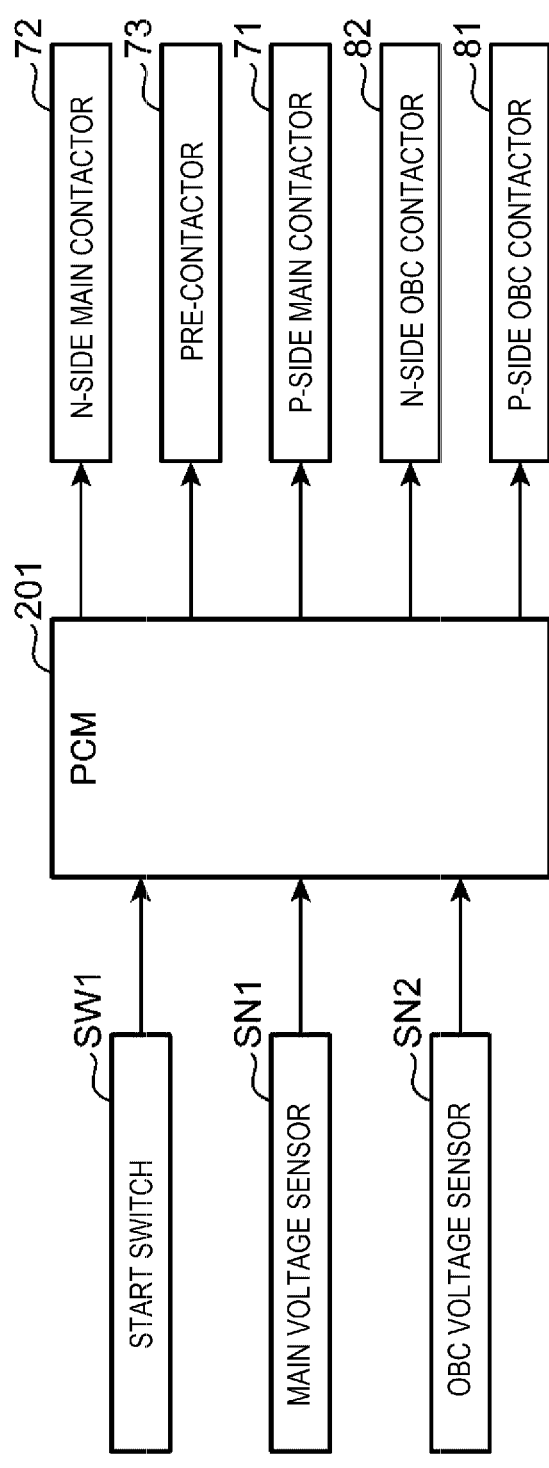
FIG. 3 is a block diagram illustrating a control system related to a contactor failure determination.

FIG. 3 is a block diagram illustrating a control configuration related to the contactors. Each of the contactors is primarily controlled by the PCM 201. More specifically, the PCM 201 is supplied with the electric power from the low-voltage battery 3. The PCM 201 opens/closes each of the contactors by switching between a supply and a stop of the electric power from the low-voltage battery 3 to the respective contactor. The PCM 201 is an example of a "controller" in the present disclosure.

The PCM 201 receives detection information from the various sensors and operation signals of various switches. More specifically, the PCM 201 receives detection signals of the main voltage sensor SN1 and the OBC voltage sensor SN2. Hereinafter, the voltage of the high-voltage circuit 30, which is detected by the main voltage sensor SN1, will appropriately be referred to as a main voltage, and the voltage of the OBC circuit 40, which is detected by the OBC voltage sensor SN2, will appropriately be referred to as an OBC voltage.

The vehicle 1 is provided with a start switch SW1 with which an occupant starts/stops the vehicle 1. An operation signal of this start switch SW1 is also input to the PCM 201. The start switch SW1 is OFF during the stop of the vehicle. When the start switch SW1 is turned ON, the PCM 201 determines that a start request of the vehicle 1 (a vehicle start request) has been made (the start request is made for the vehicle 1). When determining that the start request has been made, the PCM 201 starts the vehicle 1. More specifically, the PCM 201 starts energizing the controllers 200 to 207 to activate these controllers, and brings the various devices into an actuatable state. Thereafter, the motor 4 starts driving in response to a driver's operation.

Meanwhile, when the start switch SW1 is switched from ON to OFF, the PCM 201 opens/closes the contactors such that a state of each of the contactors after a lapse of a specified time (after it is not determined that the contactor fails in a contactor failure determination, which will be described below, and this failure determination is terminated) becomes a state where the main contactors 71, 72 are closed and the pre-contactor 73 and the OBC contactors 81, 82 are opened. In addition, when the start switch SW1 is switched from ON to OFF, the PCM 201 opens/closes the contactors such that the state of each of the contactors after the lapse of the specified time becomes a state where the main contactors 71, 72, the pre-contactor 73, and the OBC contactors 81, 82 are closed.

(Contactor Failure Determination)

Next, a description will be made on a failure determination of each of the contactors 71, 72, 73, 81, 82 executed by the PCM 201. The failure determination is executed when the start request of the vehicle 1 is made (when the start switch SW1 is switched from OFF to ON) and when the vehicle 1 is stopped (when the start switch SW1 is switched from ON to OFF).

When the start request of the vehicle 1 is made, the PCM 201 executes the failure determination of the one OBC contactor 81 (82) of the two OBC contactors 81, 82. Then, when the start request of the vehicle 1 is made next time, the PCM 201 switches the OBC contactor as a failure determination target and executes the failure determination of the other OBC contactor 82 (81). That is, the PCM 201 alternately executes the failure determination of the P-side OBC contactor 81 and the failure determination of the N-side OBC contactor 82 every time the start request of the vehicle 1 is made.

Figure 4:
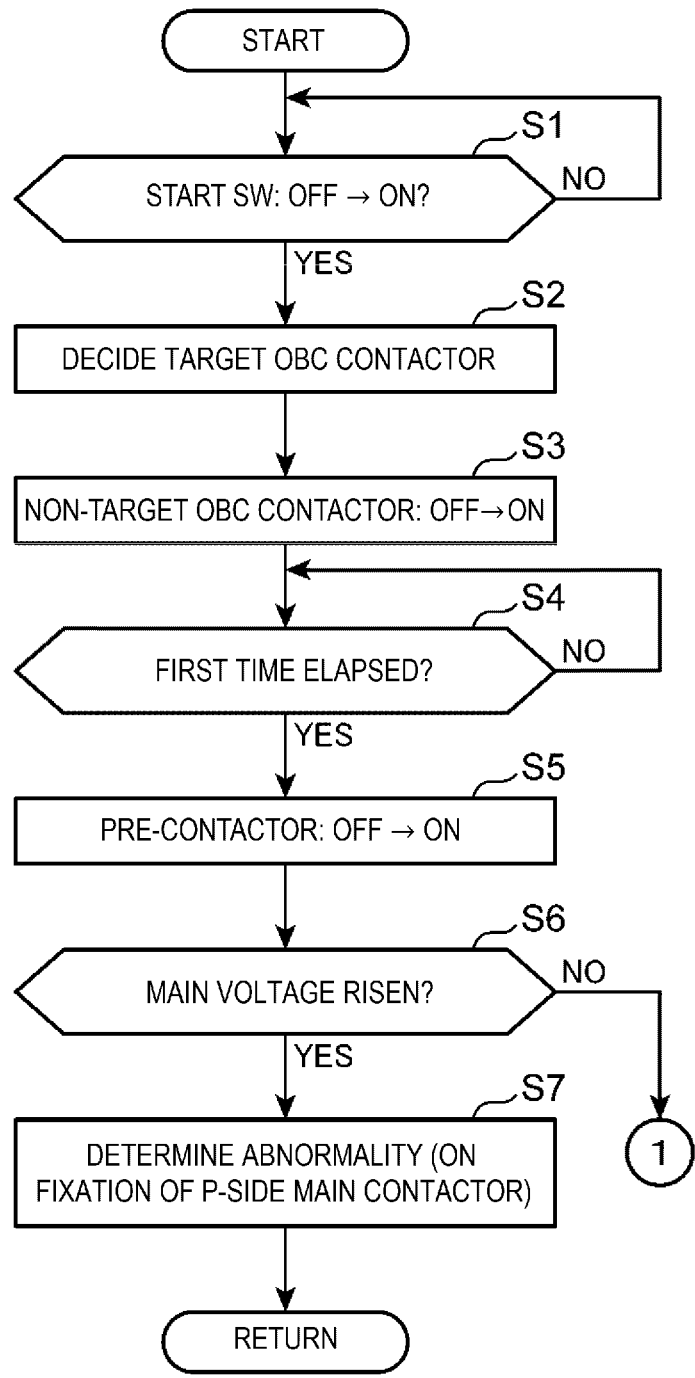
FIG. 4 is a flowchart illustrating a part of a procedure for the contactor failure determination that is executed when a vehicle start request is made.
Figure 5:
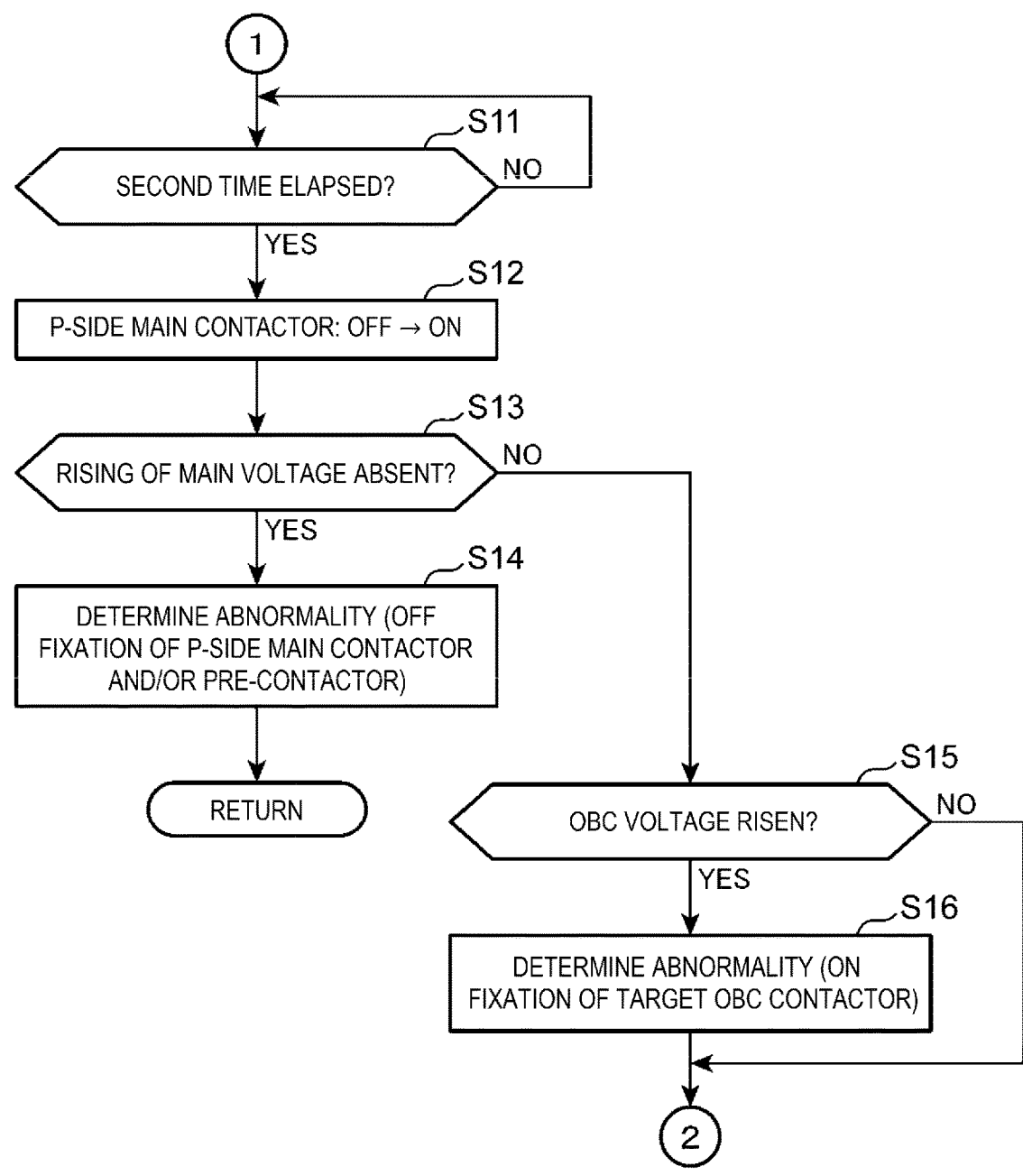
FIG. 5 is a flowchart illustrating a subsequent part of the procedure illustrated in FIG. 4.
Figure 6:
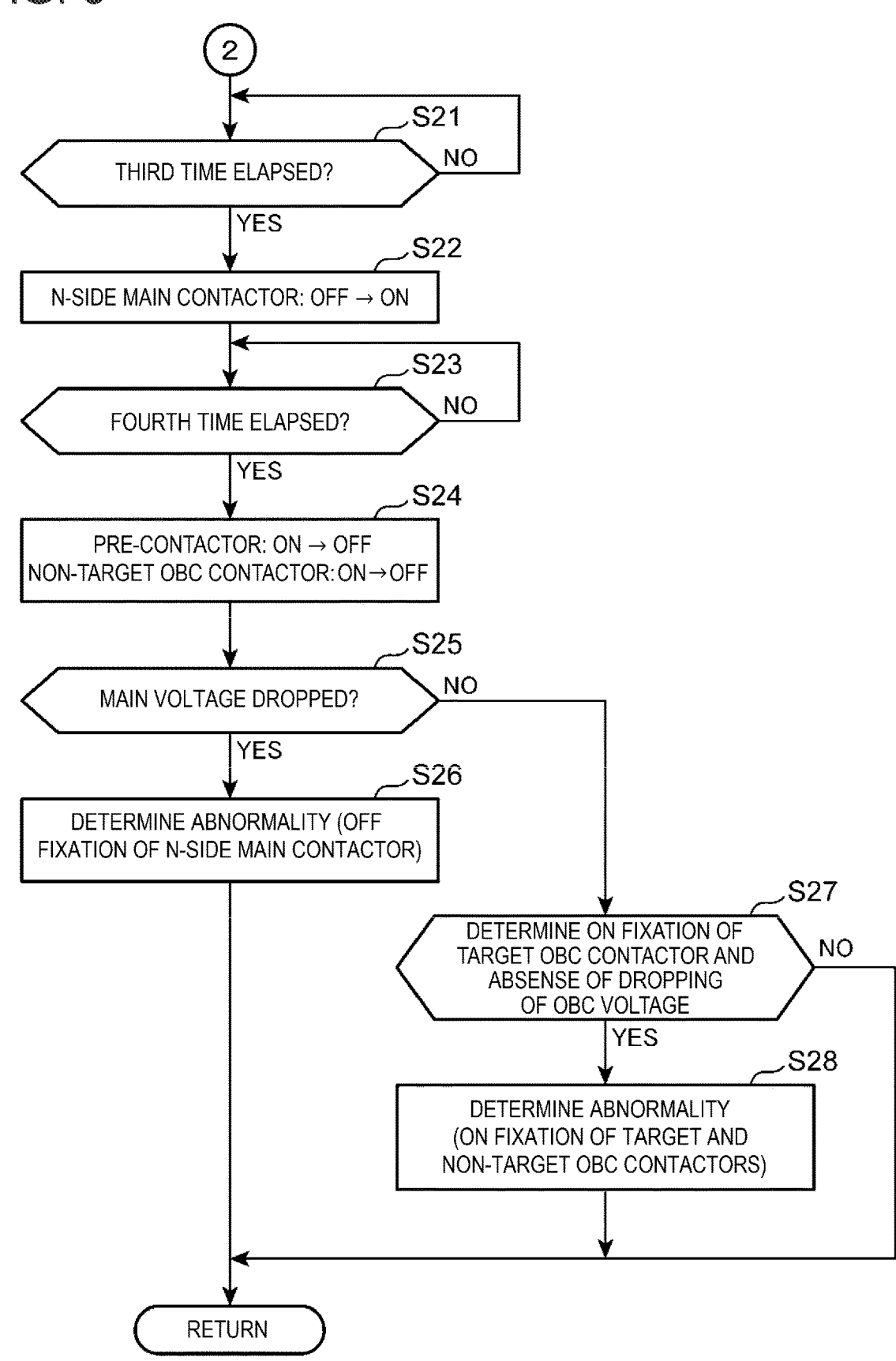
FIG. 6 is a flowchart illustrating a subsequent part of the procedure illustrated in FIG. 5.
Figure 7:
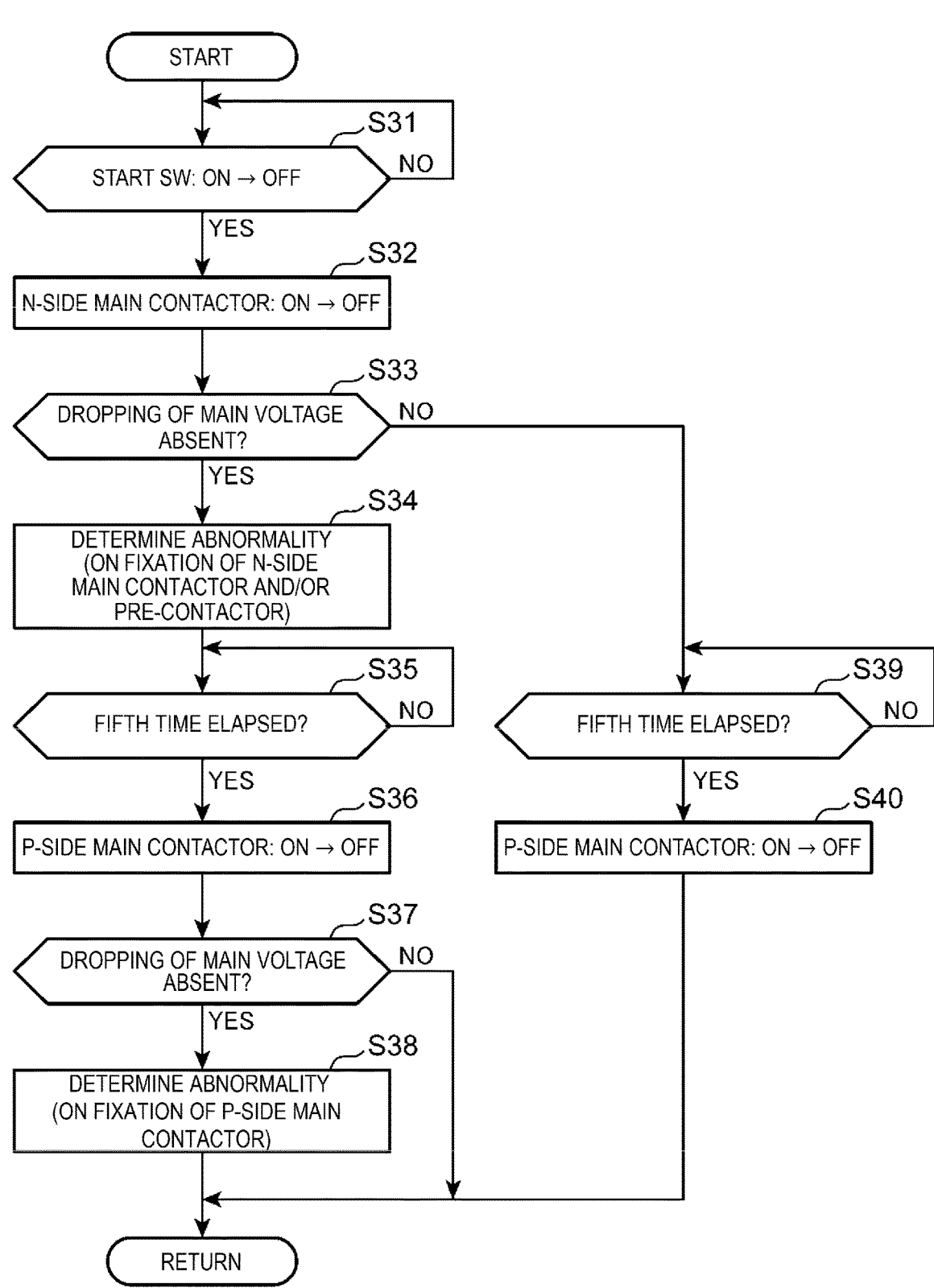
FIG. 7 is a flowchart illustrating a procedure of the contactor failure determination that is executed when the vehicle is stopped.
Figure 8:
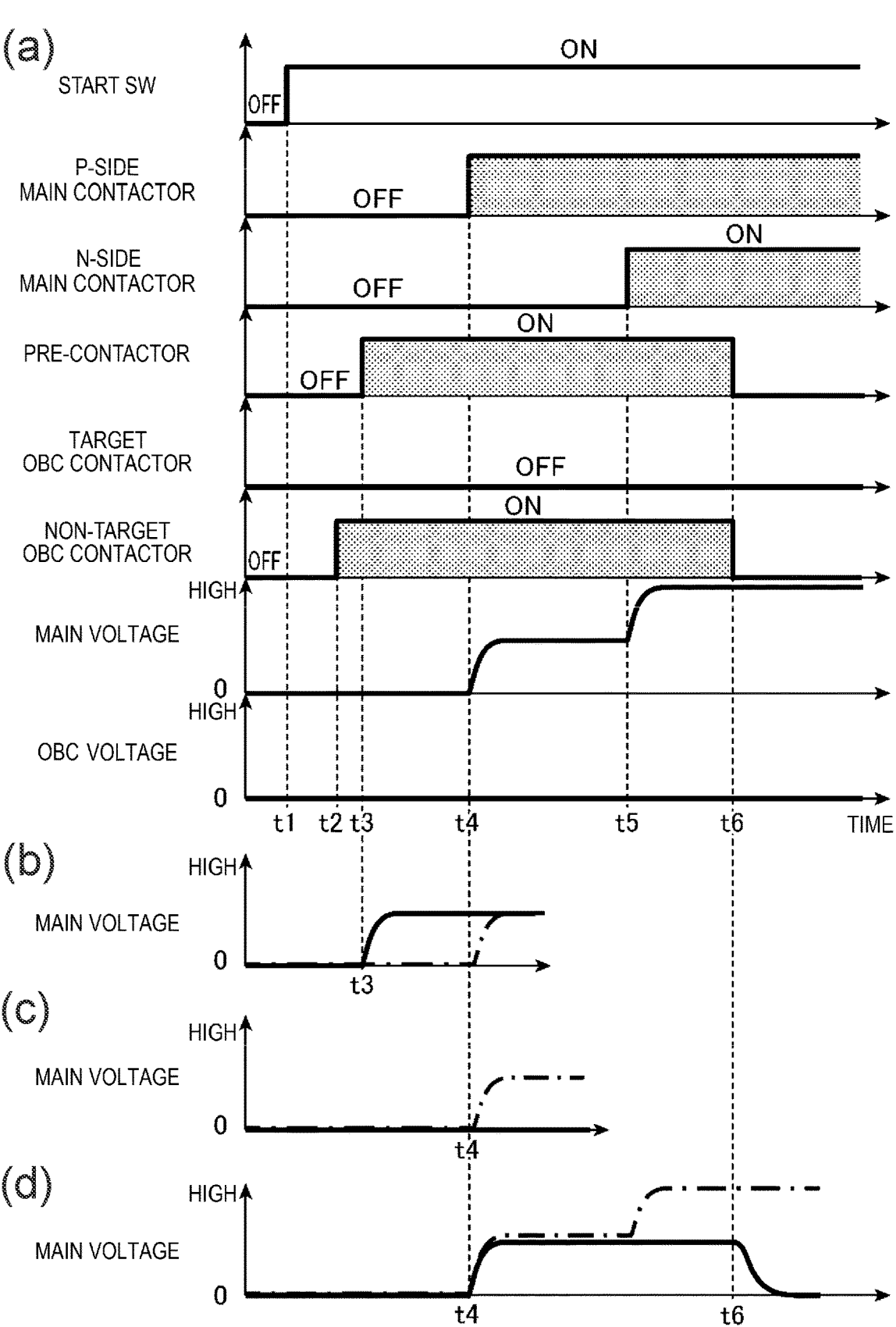
FIG. 8 includes graphs illustrating time changes in parameters at the time when the vehicle start request is made, in which (a) is a graph in the case where contactors are normal, (b) is a graph of a main voltage in the case where a P-side main contactor is fixed to be ON, (c) is a graph of the main voltage in the case where at least one of the P-side main contactor and a pre-contactor is fixed to be OFF, and (d) is a graph in the case where an N-side main contactor is fixed to be OFF.
Figure 9:
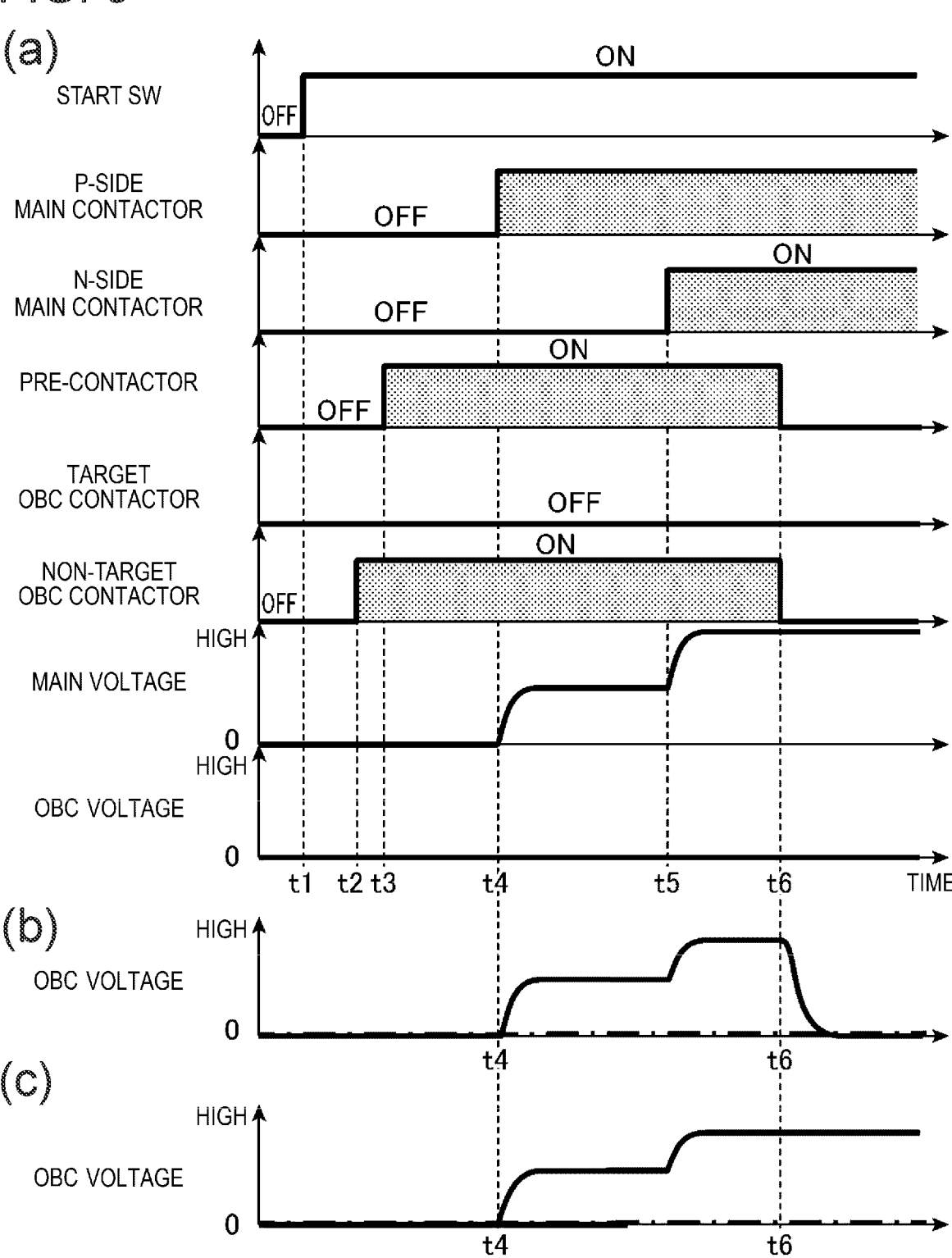
Figure 10:
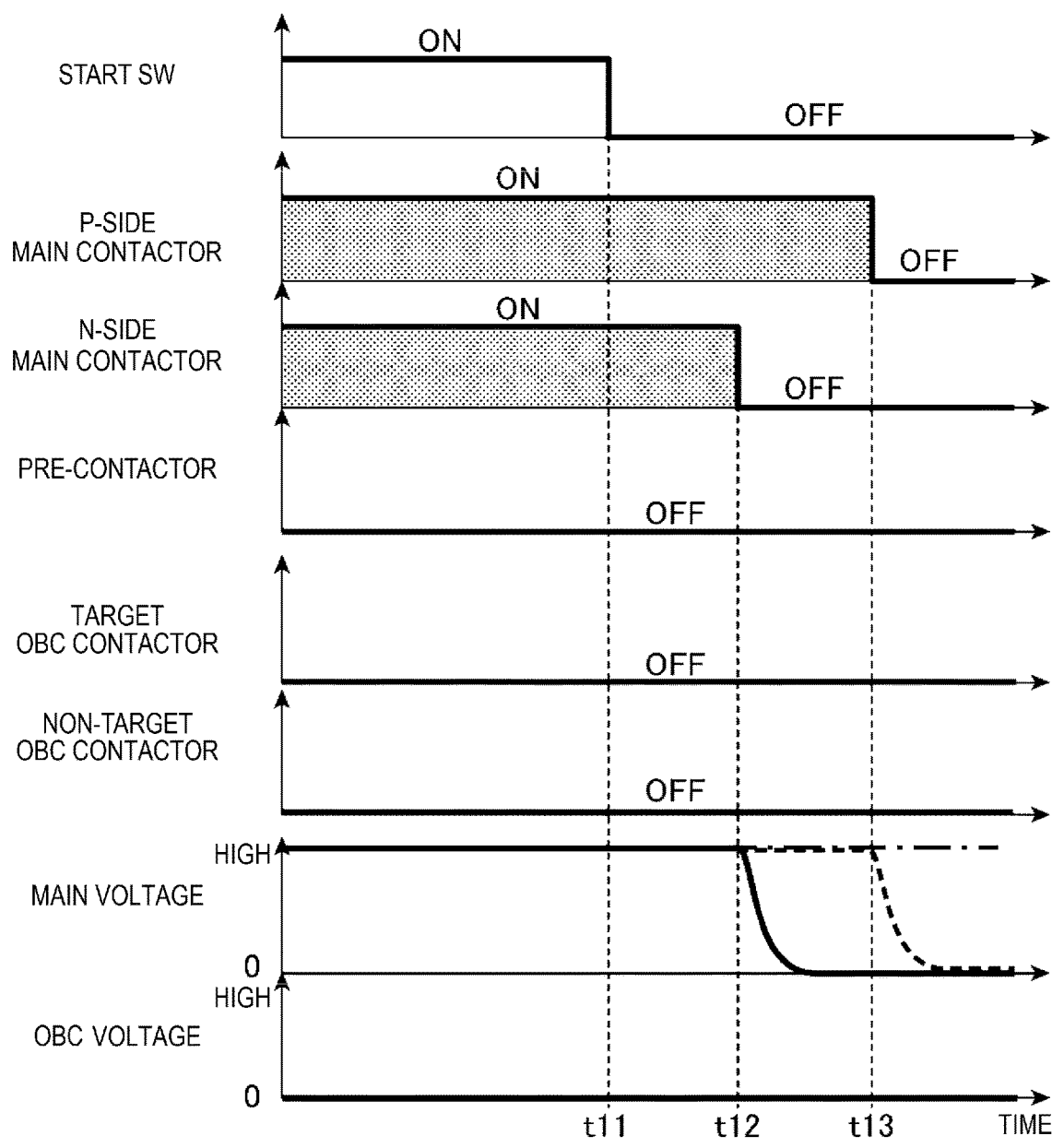
FIG. 10 is a graph illustrating the time changes in the parameters at the time when the vehicle is stopped.

FIG. 4 to FIG. 6 are flowcharts illustrating a procedure for the contactor failure determination that is executed when the start request of the vehicle 1 is made. FIG. 7 is a flowchart illustrating a procedure for the contactor failure determination that is executed when the vehicle 1 is stopped. FIGS. 8 and 9 are graphs illustrating a time change in each parameter when the start request is made. FIG. 10 is a graph illustrating the time change in each of the parameters when the vehicle 1 is stopped. Hereinafter, the closed state of the contactor will appropriately be referred to as ON, and the open state thereof will appropriately be referred to as OFF. In addition, failure of the contactor in the closed state will be referred to as ON fixation, and failure thereof in the open state will be referred to as OFF fixation.

In FIG. 8, (a) sequentially illustrates, from the top, a state of the start switch SW1, commands from the PCM 201 to the P-side main contactor 71, the N-side main contactor 72, the pre-contactor 73, the OBC contactor 81 (82) as the failure determination target (the target OBC contactor), and the OBC contactor 82 (81) that is not the failure determination target (a non-target OBC contactor), the main voltage, and the OBC voltage. A graph of the main voltage at (a) of FIG. 8 is a graph in the case where none of the contactors fail. A graph (a solid line) at (b) of FIG. 8 is a graph of the main voltage in the case where step S7, which will be described below, is executed and the ON fixation of the P-side main contactor 71 is determined. A graph (a solid line) at (c) of FIG. 8 is a graph of the main voltage in the case where step S14, which will be described below, is executed and the OFF fixation of at least one of the P-side main contactor 71 and the pre-contactor 73 is determined. A graph (a solid line) at (d) of FIG. 8 is a graph of the main voltage in the case where step S26, which will be described below, is executed and the OFF fixation of the N-side main contactor 72 is determined. In FIG. 8, (b) and (c) illustrate a part of the main voltage in (a) with a chain line.

FIG. 9 at (a) includes the same graphs as those in FIG. 8 at (a). Meanwhile, a graph (a solid line) at (b) of FIG. 9 is a graph of the OBC voltage in the case where step S16, which will be described below, is executed and the ON fixation of the target OBC contactor 81 (82) is determined. A graph (a solid line) at (c) of FIG. 9 is a graph of the OBC voltage in the case where step S28, which will be described below, is executed and the ON fixation of both of the OBC contactors 81, 82 is determined. In FIG. 9, (b) and (c) illustrate the OBC voltage in (a) with a chain line.

FIG. 10 illustrates graphs of the same parameters as those in (a) of FIGS. 8 and 9. In a graph of the main voltage in FIG. 10, a solid line is a graph in the case where none of the contactors fail, a chain line is a graph in the case where step S34, which will be described below, is executed and the ON fixation of at least one of the N-side main contactor 72 and the pre-contactor 73 is determined, and a broken line is a graph in the case where step S38, which will be described below, is executed and the ON fixation of the P-side main contactor 71 is determined.

(Failure Determination Processing at Start)

The flowchart in FIG. 4 is executed in the following state. The start switch SW1 is OFF, the OFF command is output to each of the contactors from the PCM 201, the high-voltage battery 2 and the high-voltage circuit 30 are electrically interrupted, and the main voltage is thereby near zero.

First, the PCM 201 determines whether the start switch SW1 has been switched from OFF to ON and the start request of the vehicle 1 has been made (step S1). This determination is made on the basis of the signal from the start switch SW1. In the example illustrated in FIGS. 8 and 9, at time t1, the start switch SW1 is switched from OFF to ON.

If it is determined YES in step S1 (if the start switch SW1 has been switched from OFF to ON), the PCM 201 decides one of the P-side OBC contactor 81 and the N-side OBC contactor 82 as the target OBC contactor (step S2). More specifically, the PCM 201 decides, as the new failure determination target, the different OBC contactor 81 (82) from the OBC contactor 82 (81) decided as the failure determination target in step S2, which has been executed last time in conjunction with switching of the start switch SW1 to ON.

Next, the PCM 201 switches the command to the non-target OBC contactor 82 (81), which is the different OBC contactor 82 (81) from the OBC contactor 81 (82) decided as the target OBC contactor in step S2, from OFF to ON (step S3). In the example illustrated in FIGS. 8 and 9, at time t2, the command to the non-target OBC contactor 82 (81) is switched to ON.

Next, the PCM 201 waits for a specified first time to elapse after step S3 (waits until a determination in step S4 becomes YES), and then switches the command to the pre-contactor 73 from OFF to ON (step S5). In the example illustrated in FIGS. 8 and 9, at time t3, the command to the pre-contactor 73 is switched to ON.

When step S5 is executed, the command output from the PCM 201 to the P-side main contactor 71 is OFF. Accordingly, as long as the P-side main contactor 71 is normal, the high-voltage battery 2 and the high-voltage circuit 30 are maintained in an electrically interrupted state even when the pre-contactor 73 is turned ON in step S5. For this reason, in this case, as illustrated in FIG. 8 at (a), the main voltage is maintained near zero even after the time t3 (after execution of step S5). On the other hand, in the case where the P-side main contactor 71 is fixed to be ON (i.e., stuck in an ON state), the electrical connection between the high-voltage battery 2 and the high-voltage circuit 30 is established when the pre-contactor 73 is turned ON in step S5. As a result, in this case, as illustrated in FIG. 8 at (b), the main voltage rises (increases) after the time t3 (after execution of step S5).

Thus, after execution of step S5, the PCM 201 determines whether the main voltage has risen (increased) (step S6). If this determination is YES, and the main voltage has risen, the PCM 201 determines that the P-side main contactor 71 is fixed to be ON (step S7). In addition, the PCM 201 notifies the occupant of abnormality by causing the HMI device 208 to provide a display for notifying the abnormality, or the like. Thereafter, the PCM 201 terminates the failure determination.

On the other hand, if it is determined NO in step S6, and the main voltage has not risen, the processing proceeds to step S11 in FIG. 5. In step S11, the PCM 201 determines whether a specified second time has elapsed since execution of step S5. Then, the PCM 201 waits for this determination to become YES (waits until the second time elapses since execution of step S5), and then executes step S12. In step S12, the PCM 201 switches the command to the P-side main contactor 71 from OFF to ON. In the example illustrated in FIGS. 8 and 9, at time t4, the command to the P-side main contactor 71 is switched to ON.

As long as neither the pre-contactor 73 nor the P-side main contactor 71 is fixed to be OFF, both of the pre-contactor 73 and the P-side main contactor 71 are turned ON in step S12. Thus, the electrical connection between the high-voltage circuit 30 and the high-voltage battery 2 is established. Accordingly, in this case, as illustrated in FIG. 8 at (a), the main voltage rises (increases) after the time t4 (after execution of step S12). On the other hand, in the case where at least one of the pre-contactor 73 and the P-side main contactor 71 is fixed to be OFF, the high-voltage circuit 30 and the high-voltage battery 2 are maintained in the electrically interrupted state even after execution of step S12. For this reason, in this case, as illustrated in FIG. 8 at (c), the main voltage does not change before and after the time t4 (before and after execution of step S12) and is maintained near zero.

Thus, after execution of step S12, the PCM 201 determines whether rising of (the increase in) the main voltage is absent (step S13). If this determination is YES, and rising of the main voltage is absent, the PCM 201 determines that at least one of the pre-contactor 73 and the P-side main contactor 71 is fixed to be OFF (step S14). In addition, the PCM 201 notifies the occupant of the abnormality by causing the HMI device 208 to provide the display for notifying the abnormality, or the like. Thereafter, the PCM 201 terminates the failure determination.

When step S12 is executed, the command output from the PCM 201 to the non-target OBC contactor 82 (81) is ON, and the command output therefrom to the target OBC contactor 81 (82) is OFF. Thus, as long as the target OBC contactor 81 (82) is not fixed to be ON, the high-voltage circuit 30 and the OBC circuit 40 are maintained in the electrically interrupted state at the time point of executing step S12. That is, as long as the target OBC contactor 81 (82) is not fixed to be ON, the OBC voltage is maintained near zero even when the high-voltage circuit 30 and the high-voltage battery 2 are electrically connected due to execution of step S12. For this reason, in this case, as illustrated in FIG. 9 at (a), the OBC voltage is not changed before and after the time t4 (before and after execution of step S12).

On the other hand, in the case where the target OBC contactor 81 (82) is fixed to be ON, the high-voltage circuit

30 and the OBC circuit 40 are electrically connected at the time point of executing step S12. Accordingly, in this case, when the high-voltage circuit 30 and the high-voltage battery 2 are electrically connected due to execution of step S12, the OBC voltage rises (increases). As a result, in this case, as illustrated in FIG. 9 at (b), the OBC voltage rises (increases) after the time t4 (after execution of step S12).

For this reason, if it is determined NO in step S13, and the main voltage has risen (increased) after execution of step S12, that is, when the high-voltage circuit 30 and the high-voltage battery 2 are electrically connected due to execution of step S12, the processing proceeds to step S15. Then, in step S15, the PCM 201 determines whether the OBC voltage has risen (increased) due to execution of step S12. If it is determined YES in step S15, and the OBC voltage has risen, the PCM 201 determines that the target OBC contactor 81 (82) is fixed to be ON (step S16). In addition, the PCM 201 notifies the occupant of the abnormality by causing the HMI device 208 to provide the display for notifying the abnormality, or the like.

If it is determined NO in step S15, and after step S16, the processing proceeds to step S21 in FIG. 6.

In step S21, the PCM 201 determines whether a specified third time has elapsed since execution of step S12. Then, the PCM 201 waits for this determination to become YES (waits until the third time elapses after execution of step S12), and then switches the command to the N-side main contactor 72 from OFF to ON (step S22). In the example illustrated in FIGS. 8 and 9, at time t5, the command to the N-side main contactor 72 is switched to ON. Next, the PCM 201 waits for a specified fourth time to elapse after step S22 (waits until a determination in step S23 becomes YES), and then switches the commands to both of the pre-contactor 73 and the non-target OBC contactor 82 (81) from ON to OFF (step S24). In the example illustrated in FIGS. 8 and 9, at time t6, the commands to the pre-contactor 73 and the non-target OBC contactor 82 (81) are switched to OFF.

At the time point of executing step S24, the commands output from the PCM 201 to the P-side main contactor 71 and the N-side main contactor 72 are ON. Thus, as long as the N-side main contactor 72 is normal, the electricity between the high-voltage battery 2 and the high-voltage circuit 30 during execution of step S24 flows through the N-side main contactor 72 instead of the pre-contactor 73. For this reason, as long as the N-side main contactor 72 is normal, a current path is not changed even when step S24 is executed and the command to the pre-contactor 73 is switched to OFF. Then, as illustrated in FIG. 8 at (a), the main voltage does not drop after the time t6 (after execution of step S24). On the other hand, in the case where the N-side main contactor 72 is fixed to be OFF, the electricity between the high-voltage battery 2 and the high-voltage circuit 30 at timing immediately before execution of step S24 flows through the pre-contactor 73 instead of the N-side main contactor 72. Accordingly, in this case, when the command to the pre-contactor 73 is switched to OFF in step S24, the high-voltage battery 2 and the high-voltage circuit 30 are electrically interrupted. Thus, as illustrated in FIG. 8 at (d), the main voltage drops (decreases) after the time t6 (after execution of step S24).

Thus, after execution of step S24, the PCM 201 determines whether the main voltage has dropped (decreased) (step S25). If this determination is YES, and the main voltage has dropped (decreased), the PCM 201 determines that the N-side main contactor 72 is fixed to be OFF (step S26). In addition, the PCM 201 notifies the occupant of the abnormality by causing the HMI device 208 to provide the display for notifying the abnormality, or the like. Thereafter, the PCM 201 terminates the failure determination.

At the timing immediately before execution of step S24, the command output from the PCM 201 to the non-target OBC contactor 82 (81) is ON. Thus, in the case where the target OBC contactor 81 (82) is fixed to ON (that is, in the case where step S16 is executed in conjunction with the determination of YES in step S15), at the timing immediately before execution of step S24, the OBC circuit 40 and the high-voltage circuit 30 are electrically connected. In addition, in the case where the N-side main contactor 72 is normal, and the main voltage has not dropped after execution of step S24, the electrical connection between the high-voltage battery 2 and the high-voltage circuit 30 is maintained even after execution of step S24. Thus, in the case where the main voltage has not dropped after execution of step S24, and the target OBC contactor 81 (82) is fixed to be ON, the OBC circuit 40 and the high-voltage battery 2 are electrically connected via the high-voltage circuit 30 immediately before execution of step S24.

For this reason, in the case where the main voltage has not dropped after execution of step S24, and where the non-target OBC contactor 82 (81) is not fixed to be ON while the target OBC contactor 81 (82) is fixed to be ON, as illustrated in FIG. 9B, the OBC circuit 40 and the high-voltage circuit 30 are electrically interrupted when step S24 is executed at the time t6 to switch the command to the non-target OBC contactor 82 (81) to OFF. As a result, the OBC voltage drops.

On the other hand, in the case where the main voltage does not drop after execution of step S24, and where both of the target OBC contactor 81 (82) and the non-target OBC contactor 82 (81) are fixed to be ON, the electrical connection between the OBC circuit 40 and the high-voltage circuit 30 is maintained even when step S24 is executed to switch the command to the non-target OBC contactor 82 (81) to OFF. As a result, as illustrated in FIG. 9 at (c), the OBC voltage does not drop (decrease) after the time t6 (after execution of step S24).

Accordingly, if the determination in step S25 is NO, and the main voltage does not drop after execution of step S24, the processing proceeds to step S27, and the PCM 201 determines whether the following condition is satisfied. The condition is that the ON fixation of the target OBC contactor 81 (82) has been determined (that is, the step S16 has been executed) and the dropping of (the decrease in) the OBC voltage, which is associated with execution of step S24, is absent. Then, if it is determined YES in step S27, and the above condition is satisfied, the PCM 201 determines that both of the target OBC contactor 81 (82) and the non-target OBC contactor 82 (81) are fixed to be ON (step S28). In addition, the PCM 201 notifies the occupant of the abnormality by causing the HMI device 208 to provide the display for notifying the abnormality, or the like. Thereafter, the PCM 201 terminates the failure determination. On the other hand, if it is determined NO in step S27, and the above condition is not satisfied, the PCM 201 determines that the target OBC contactor 81 (82) is normal (is not fixed to be ON), and terminates the failure determination.

Here, in this embodiment, the first to fourth times described above are set as follows. More specifically, the first time (the time t2 to the time t3) is set as a shorter time than the second time (the time t3 to the time t4). The second time (the time t3 to the time t4) is set as the shorter time than the third time (the time t4 to the time t5). The third time (the time t4 to the time t5) is set as the longer time than the fourth time (the time t5 to the time t6). The fourth time (the time t5 to the time t6) is set as the longer time than the first time (the time t2 to the time t3). The duration of each of the times is not limited to the above. However, when the duration of each of the times is set as described above, it is possible to appropriately detect the change in the voltage associated with opening/closing of each of the contactors, to further appropriately determine the failure of the contactor, and to reduce a time required for the failure determination.

(Failure Determination Processing at Stop)

The flowchart in FIG. 7 is executed in the following state. The start switch SW1 is ON, the ON command is output from the PCM 201 to the N-side main contactor 72 and the P-side main contactor 71, and the OFF command is output from the PCM 201 to the pre-contactor 73 and each of the OBC contactors 81, 82.

First, the PCM 201 determines whether the start switch SW1 has been switched from ON to OFF (step S31). This determination is made on the basis of the signal from the start switch SW1. In the example illustrated in FIG. 10, at time t11, the start switch SW1 is switched from ON to OFF.

If the start switch SW1 has been switched from ON to OFF, and it is determined YES in step S1, the PCM 201 switches the command to the N-side main contactor 72 from ON to OFF (step S32). In the example illustrated in FIG. 10, at time t12, the command to the N-side main contactor 72 is switched to OFF.

At a time point of executing step S32, the P-side main contactor 71 remains ON. Accordingly, in the case where the N-side main contactor 72 is normally switched to OFF, or in the case where the pre-contactor 73 is normally OFF, the high-voltage battery 2 and the high-voltage circuit 30 are electrically interrupted by switching the N-side main contactor 72 to be OFF. As a result, as indicated by a solid line in FIG. 10, the main voltage drops after the time t12, at which step S32 is executed. On the other hand, in the case where the N-side main contactor 72 or the pre-contactor 73 is fixed to be ON, the electrical connection between the high-voltage battery 2 and the high-voltage circuit 30 is maintained. As a result, in this case, as indicated by a chain line in FIG. 10, the main voltage does not dropped after the time t12, at which step S32 is executed.

Thus, after execution of step S32, the PCM 201 determines whether dropping of (the decrease in) the main voltage is absent (step S33). If it is determined YES in step S33, and dropping of the main voltage is absent, the PCM 201 determines that at least one of the N-side main contactor 72 and the pre-contactor 73 is fixed to be ON (step S34). On the other hand, if it is determined NO in step S33, and the main voltage has dropped, the processing proceeds to step S39.

After step S34, the PCM 201 waits for a specified fifth time to elapse after step S32 (waits until a determination in step S35 becomes YES), and then switches the command to the P-side main contactor 71 from ON to OFF (step S36). In the example illustrated in FIG. 10, at time t13, the command to the P-side main contactor 71 is switched to OFF.

Here, in the case where it is determined in step S34 that at least one of the N-side main contactor 72 and the pre-contactor 73 is fixed to be ON, the high-voltage battery 2 and the high-voltage circuit 30 are electrically connected at timing immediately before execution of step S36. Accordingly, as long as the P-side main contactor 71 is not fixed to be ON, the high-voltage battery 2 and the high-voltage circuit 30 are electrically interrupted by switching the command to the P-side main contactor 71 to OFF in step S36. As a result, as indicated by a broken line in FIG. 10, the main voltage drops after the time t13 (after execution of step S36).

On the other hand, in the case where the P-side main contactor 71 is fixed to be ON, the electrical connection between the high-voltage battery 2 and the high-voltage circuit 30 is maintained even when the command to the P-side main contactor 71 is switched to OFF in step S36. As a result, in this case, as indicated by the chain line in FIG. 10, the main voltage does not drop even after the time t13, at which step S36 is executed.

Thus, after execution of step S36, the PCM 201 determines whether dropping of the main voltage is absent (step S37). If it is determined YES in step S37, and dropping of the main voltage is absent, the PCM 201 determines that the P-side main contactor 71 is fixed to be ON (step S38). In addition, the PCM 201 notifies the occupant of the abnormality by causing the HMI device 208 to provide the display for notifying the abnormality, or the like. Thereafter, the PCM 201 terminates the failure determination.

On the other hand, if it is determined NO in step S37, and the main voltage has dropped, the PCM 201 terminates the processing without determining that the P-side main contactor 71 is fixed to be ON.

The description will return to step S33. If it is determined NO in step S33, and the main voltage has dropped due to execution of step S32, similar to steps S35 and S36, the PCM 201 waits for the specified fifth time to elapse after step S32 (waits until a determination in step S39 becomes YES), and then switches the command to the P-side main contactor 71 from ON to OFF (step S40). Then, in this case, the processing is terminated as is. Although the illustration and the like are not provided, in this embodiment, after above step S32, the PCM 201 also executes discharging processing of the high-voltage circuit 30.

Here, the above step S3 is an example of a "first control" in the present disclosure, the above step S5 is an example of a "second control" in the present disclosure, and the above step S12 is an example of a "third control" in the present disclosure. In addition, the above step S22 is an example of a "fourth control" in the present disclosure, the step of switching the pre-contactor 73 to be OFF in the above step S24 is an example of a "fifth control" in the present disclosure, and the step of switching the non-target OBC contactor 82 (81) to be OFF in the above step S24 is an example of a "sixth control" in the present disclosure.

(Operational Effects and the Like)

As it has been described so far, in the above embodiment, when determining that the start switch SW1 has been switched from OFF to ON and that the request to start the vehicle 1 has been made, the PCM 201 executes steps S3, S5, and S12 to turn ON the non-target OBC contactor 82 (81), the pre-contactor 73, and the P-side main contactor 71 in this order. Accordingly, it is possible to avoid these contactors from being turned ON at the same time immediately after the ON operation of the start switch SW1 and thus to avoid generation of a loud noise that is associated with turning ON of the multiple contactors at the same time. Therefore, it is possible to prevent the occupant from feeling a sense of discomfort at the start of the vehicle 1.

In addition, the P-side main contactor 71 is turned ON in the state where the pre-contactor 73 is ON and the N-side main contactor 72 is OFF. That is, the positive electrode terminal 2a of the high-voltage battery 2 and the high-voltage circuit 30 are electrically connected in the state where the negative electrode terminal 2b of the high-voltage battery 2 and the high-voltage circuit 30 are connected via the pre-contactor 73 with the high electrical resistance. Thus, it is possible to prevent the high in-rush current from flowing from the high-voltage battery 2 to the high-voltage circuit 30 when the high-voltage battery 2 and the high-voltage circuit 30 are electrically connected and thus to prevent failure of the electrical devices provided in the high-voltage circuit 30. In addition, in the case where the high-voltage circuit 30 and the OBC circuit 40 are electrically connected, it is also possible to prevent the above in-rush current from flowing into the OBC circuit 40 and thus to prevent the failure of the OBC 41.

Furthermore, in the above embodiment, when the target OBC contactor 81 (82) is fixed to be ON, the determination in step S15 is made by using the fact that the OBC voltage has risen after execution of step S12 (after the P-side main contactor 71 is switched to be ON). Then, in the case where the OBC voltage has risen after execution of step S12 (in the case where it is determined YES in step S15), it is determined that the target OBC contactor 81 (82) is fixed to be ON. Thus, it is possible to appropriately determine whether the target OBC contactor 81 (82) is fixed to be ON, that is, whether the target OBC contactor 81 (82) fails in the closed state.

In the above embodiment, the PCM 201 alternately executes the failure determination of the P-side OBC contactor 81 and the failure determination of the N-side OBC contactor 82 every time the start request of the vehicle 1 is made. Thus, the failure of the two OBC contactors 81, 82 can be determined in response to at least two times of making of the start request. In addition, only one of the OBC contactors 81, 82 is subjected to the failure determination at the time when the single start request is made. Thus, compared to a case where the failure determination is made for both of the two OBC contactors 81, 82, the time required for the failure determination can be reduced. Therefore, the vehicle 1 can start traveling promptly after the start request is made.

In the above embodiment, after step S12, step S22 is executed to switch the N-side main contactor 72 to be ON. Thereafter, step S24 is executed to switch the pre-contactor 73 and the non-target OBC contactor 82 (81) to be OFF. That is, after step S12, the high-voltage battery 2 and the high-voltage circuit 30 are connected with the low electrical resistance, and the electrical connection between the high-voltage battery 2 and the OBC circuit 40 via the high-voltage circuit 30 is interrupted. Accordingly, immediately after execution of step S24, the high electric power can be supplied to the motor 4, which is provided in the high-voltage circuit 30. Therefore, the vehicle 1 can start traveling appropriately and promptly.

In the above embodiment, when the N-side main contactor 72 is fixed to be OFF, the determination in step S25 is made by using the fact that the main voltage drops after execution of step S24 (after the pre-contactor 73 is switched to be OFF). Then, in the case where the main voltage drops after execution of step S24 (in the case where it is determined YES in step S25), it is determined that the N-side main contactor 72 is fixed to be OFF. Therefore, it is possible to appropriately determine whether the N-side main contactor 72 is fixed to be OFF.

In the above embodiment, when the P-side main contactor 71 is fixed to be ON, the determination in step S6 is made by using the fact that the main voltage has risen after execution of step S5 (after the pre-contactor 73 is switched to be ON). Then, in the case where the main voltage has risen after execution of step S5 (in the case where it is determined YES in step S6), it is determined that the P-side main contactor 71 is fixed to be ON. Therefore, it is possible to appropriately determine whether the P-side main contactor 71 is fixed to be ON.

In the above embodiment, when at least one of the P-side main contactor 71 and the pre-contactor 73 is fixed to be OFF, the determination in step S13 is made by using the fact that rising of the main voltage is absent after execution of step S12 (after the P-side main contactor 71 is switched to be ON). Then, in the case where the rising of the main voltage is absent after execution of step S12 (in the case where it is determined YES in step S13), it is determined that at least one of the P-side main contactor 71 and the pre-contactor 73 is fixed to be OFF. Therefore, it is possible to appropriately determine the failure of the P-side main contactor 71 and the pre-contactor 73.

In the above embodiment, when both of the OBC contactors 81, 82 are fixed to be ON, the determination in step S27 is made by using the fact that dropping of the OBC voltage is absent after execution of step S24 (after the non-target OBC contactor 82 (81) is switched to be OFF). Then, in the case where the dropping of the OBC voltage is absent after execution of step S24 (in the case where it is determined YES in step S27), it is determined that both of the OBC contactors 81, 82 are fixed to be ON. Therefore, it is possible to appropriately determine the failure of these OBC contactors 81, 82.

(Modified Embodiments)

In the above embodiment, the description has been made on the case where the main voltage sensor SN1 for detecting the voltage of the high-voltage circuit 30 is provided to the DC/DC converter 8. However, the location where the main voltage sensor SN1 is provided is not limited thereto. In addition, the sensor for detecting the rising and dropping of the voltage of the high-voltage circuit 30 is not limited thereto. For example, the rising and dropping of the voltage of the high-voltage circuit 30 may be detected by using a current sensor or the like. Similarly, instead of the OBC voltage sensor SN2, the current sensor or the like may be used to detect the rising and dropping of the voltage of the OBC circuit 40.

In the above embodiment, the description has been made on the case where the pre-contactor 73 is disposed in parallel with the N-side main contactor 72. However, the pre-contactor 73 may be disposed in parallel with the P-side main contactor 71. In the case where the pre-contactor 73 is disposed in parallel with the P-side main contactor 71, in the above failure determination (the flowcharts in FIG. 4 to FIG. 7), the "P-side main contactor" and the "N-side main contactor" only need to be switched.

In the above embodiment, the description has been made on the case where, when the command to the non-target OBC contactor 82 (81) is switched from OFF to ON (step S33), and the command to the pre-contactor 73 is switched from OFF to ON (step S5), it is only determined whether the P-side main contactor 71 is fixed to be ON (steps S6 and S7). However, in addition to such a determination, it may be determined whether the OBC voltage has risen. Then, in the case where the OBC voltage has risen, it may be determined that the target OBC contactor 81 (82) is fixed to be ON. In addition, the external charger may charge the high-voltage battery by using the electric power from the external DC power supply.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 High-voltage battery (battery)
2a Positive electrode terminal
2b Negative electrode terminal
3 Low-voltage battery
4 Motor
6 Inverter
30 High-voltage circuit (first circuit)
40 OBC circuit (second circuit)
41 OBC (external charger)
43 AC/DC converter
71 P-side main contactor (second main contactor, main contactor)
72 N-side main contactor (first main contactor, main contactor)
73 Pre-contactor (pre-charge contactor)
81 P-side OBC contactor (external charging contactor)
82 N-side OBC contactor (external charging contactor)
201 PCM (controller)
SN1 Main voltage sensor (second voltage sensor)
SN2 OBC voltage sensor (voltage sensor)

The invention claimed is:

1. A contactor failure determination apparatus mounted to a vehicle including a battery that includes a positive electrode terminal and a negative electrode terminal, a first circuit that includes an inverter and a motor, a first main contactor that makes or interrupts electrical connection between the first circuit and one terminal of the positive electrode terminal and the negative electrode terminal, a second main contactor that makes or interrupts electrical connection between the first circuit and the other terminal of the positive electrode terminal and the negative electrode terminal, and a pre-charge contactor that is disposed in parallel with the first main contactor and makes or interrupts the electrical connection between the first circuit and the one terminal, the contactor failure determination apparatus comprising:

a second circuit that includes an external charger configured to supply electric power from an external power supply to the battery so as to charge the battery;

a pair of external charging contactors that make or interrupt electrical connection between positive-electrode side lines of the first circuit and the second circuit and between negative-electrode side lines of the first circuit and the second circuit;

a voltage sensor configured to detect rising or dropping of a voltage of the second circuit; and a controller that controls the first main contactor, the second main contactor, the pre-charge contactor, and each of the external charging contactors such that these contactors are opened during a stop of the vehicle, wherein electrical resistance between the one terminal and the first circuit via the pre-charge contactor is set to be higher than electrical resistance between the other terminal and the first circuit via the first main contactor, in response to a vehicle start request as a request to start the vehicle being made, the controller:

executes a first control for closing one of the pair of external charging contactors;

executes a second control for closing the pre-charge contactor after execution of the first control;

executes a third control for closing the second main contactor after execution of the second control; and in response to the voltage sensor detecting that the voltage of the second circuit has risen after execution of the third control, determines that the other of the pair of external charging contactors has failed in a closed state, and when executing the first control in response to an immediately subsequent vehicle start request, the controller closes the other of the pair of external charging contactors rather than the one of the pair of external charging contactors.

2. The contactor failure determination apparatus for a vehicle according to claim 1, wherein after executing the third control, the controller closes the first main contactor and opens the pre-charge contactor and the one of the pair of external charging contactors.

3. The contactor failure determination apparatus for a vehicle according to claim 2, further comprising:

a second voltage sensor configured to detect rising or dropping of a voltage of the first circuit, wherein in response to the second voltage sensor detecting that the voltage of the first circuit has risen after execution of the second control, the controller determines that the second main contactor has failed in a closed state.

4. The contactor failure determination apparatus for a vehicle according to claim 3, wherein in response to the second voltage sensor detecting that the voltage of the first circuit has not risen after execution of the third control, the controller determines that at least one of the pre-charge contactor and the second main contactor has failed in an open state.

5. The contactor failure determination apparatus for a vehicle according to claim 4, wherein the controller:

executes a sixth control for opening the one of the pair of external charging contactors, which is closed during execution of the first control, in a state where the first circuit and the battery are electrically connected after execution of the third control, and determines that each of the pair of external charging contactors has failed in the closed state in response to the voltage sensor detecting that the voltage of the second circuit has not dropped after execution of the sixth control.

6. The contactor failure determination apparatus for a vehicle according to claim 5, wherein the external charger has an AC/DC converter that converts an AC current to a DC current, converts the AC current from an external AC power supply to the DC current, and supplies the DC current to the battery.

7. The contactor failure determination apparatus for a vehicle according to claim 6, wherein a time from execution of the first control to execution of the second control is set to be shorter than a time from execution of the second control to execution of the third control.

8. The contactor failure determination apparatus for a vehicle according to claim 1, wherein the controller:

executes a fourth control for closing the first main contactor after execution of the third control, executes a fifth control for opening the pre-charge contactor after execution of the fourth control, and in response to a second voltage sensor detecting that a voltage of the first circuit has dropped after execution of the fifth control, determines that the first main contactor has failed in an open state.

9. The contactor failure determination apparatus for a vehicle according to claim 8, wherein a time from execution of the second control to execution of the third control is set to be shorter than a time from execution of the third control to execution of the fourth control.

10. The contactor failure determination apparatus for a vehicle according to claim 9, wherein the time from execution of the third control to execution of the fourth control is set to be longer than a time from execution of the fourth control to execution of the fifth control.

11. The contactor failure determination apparatus for a vehicle according to claim 10, wherein the time from execution of the fourth control to execution of the fifth control is set to be longer than a time from execution of the first control to execution of the second control.

12. The contactor failure determination apparatus for a vehicle according to claim 1, wherein after executing the third control, the controller closes the first main contactor and opens the pre-charge contactor and the one of the pair of external charging contactors.

13. The contactor failure determination apparatus for a vehicle according to claim 1 further comprising:

a second voltage sensor configured to detect rising or dropping of a voltage of the first circuit, wherein in response to the second voltage sensor detecting that the voltage of the first circuit has risen after execution of the second control, the controller determines that the second main contactor has failed in a closed state.

14. The contactor failure determination apparatus for a vehicle according to claim 1, wherein in response to a second voltage sensor detecting that a voltage of the first circuit has not risen after execution of the third control, the controller determines that at least one of the pre-charge contactor and the second main contactor has failed in an open state.

15. The contactor failure determination apparatus for a vehicle according to claim 1, wherein the controller:

executes a sixth control for opening the one of the pair of external charging contactors, which is closed during execution of the first control, in a state where the first circuit and the battery are electrically connected after execution of the third control, and determines that each of the pair of external charging contactors has failed in the closed state in response to the detector detecting that the voltage of the second circuit has not dropped after execution of the sixth control.

16. The contactor failure determination apparatus for a vehicle according to claim 1, wherein the external charger has an AC/DC converter that converts an AC current to a DC current, converts the AC current from an external AC power supply to the DC current, and supplies the DC current to the battery.

17. The contactor failure determination apparatus for a vehicle according to claim 1, wherein a time from execution of the first control to execution of the second control is set to be shorter than a time from execution of the second control to execution of the third control.

18. The contactor failure determination apparatus for a vehicle according to claim 1, further comprising:

a second voltage sensor configured to detect rising or dropping of a voltage of the first circuit, wherein in response to the second voltage sensor detecting that the voltage of the first circuit has risen after execution of the second control, the controller determines that the second main contactor has failed in a closed state.

19. The contactor failure determination apparatus for a vehicle according to claim 1, wherein in response to a second voltage sensor detecting that a voltage of the first circuit has not risen after execution of the third control, the controller determines that at least one of the pre-charge contactor and the second main contactor has failed in an open state.

20. A contactor failure determination apparatus mounted to a vehicle including a battery that includes a positive electrode terminal and a negative electrode terminal, a first circuit that includes an inverter and a motor, a first main contactor that makes or interrupts electrical connection between the first circuit and one terminal of the positive electrode terminal and the negative electrode terminal, a second main contactor that makes or interrupts electrical connection between the first circuit and the other terminal of the positive electrode terminal and the negative electrode terminal, and a pre-charge contactor that is disposed in parallel with the first main contactor and makes or interrupts the electrical connection between the first circuit and the one terminal, the contactor failure determination apparatus comprising:

a second circuit that includes an external charger configured to supply electric power from an external power supply to the battery so as to charge the battery;

a pair of external charging contactors that make or interrupt electrical connection between positive-electrode side lines of the first circuit and the second circuit and between negative-electrode side lines of the first circuit and the second circuit;

a voltage sensor configured to detect rising or dropping of a voltage of the second circuit; and a controller that controls the first main contactor, the second main contactor, the pre-charge contactor, and each of the external charging contactors such that these contactors are opened during a stop of the vehicle, wherein electrical resistance between the one terminal and the first circuit via the pre-charge contactor is set to be higher than electrical resistance between the other terminal and the first circuit via the first main contactor, and in response to a vehicle start request as a request to start the vehicle being made, the controller:

executes a first control for closing one of the pair of external charging contactors;

executes a second control for closing the pre-charge contactor after execution of the first control;

executes a third control for closing the second main contactor after execution of the second control; and in response to the voltage sensor detecting that the voltage of the second circuit has risen after execution of the third control, determines that the other of the pair of external charging contactors has failed in a closed state, wherein after executing the third control, the controller closes the first main contactor and opens the pre-charge contactor and the one of the pair of external charging contactors.

* * * * *